(12) United States Patent
Steppat et al.

(10) Patent No.: US 7,865,989 B2
(45) Date of Patent: Jan. 11, 2011

(54) SPRING ELEMENT UNIT FOR A PADDING ELEMENT, PARTICULARLY A MATTRESS

(75) Inventors: Maik Steppat, Trunkelsberg (DE); Barbara Puhane, Memmingen (DE); Manfred Hohenhorst, Rot an der Rot (DE); Volker Maidhof, Sontheim (DE); Andreas Bauer, Memmingerberg (DE)

(73) Assignee: Metzeler Schaum GmbH, Memmingen, DE (US)

( * ) Notice: Subject to any disclaimer, the term of this patent is extended or adjusted under 35 U.S.C. 154(b) by 183 days.

(21) Appl. No.: 12/161,822

(22) PCT Filed: May 24, 2007

(86) PCT No.: PCT/EP2007/055062

§ 371 (c)(1),
(2), (4) Date: Jan. 16, 2009

(87) PCT Pub. No.: WO2007/137993

PCT Pub. Date: Dec. 6, 2007

(65) Prior Publication Data

US 2010/0218318 A1    Sep. 2, 2010

(30) Foreign Application Priority Data

May 30, 2006    (DE) .................. 10 2006 025 136

(51) Int. Cl.
*A47C 27/15* (2006.01)
(52) U.S. Cl. .................... 5/740; 5/727; 5/719
(58) Field of Classification Search .............. 5/719, 5/727, 730, 740; 267/145, 153
See application file for complete search history.

(56) References Cited

U.S. PATENT DOCUMENTS

| | | | |
|---|---|---|---|
| 1,296,359 A | 3/1919 | Brown |
| 1,980,445 A | 11/1934 | Sherover |
| 1,994,234 A | 3/1935 | Sherover |
| 2,530,058 A | 1/1951 | Burns |
| 2,887,425 A | 5/1959 | Holland |

(Continued)

FOREIGN PATENT DOCUMENTS

BE    411250    9/1935

(Continued)

OTHER PUBLICATIONS

U.S. Appl. No. 29,321,724, filed Jul. 22, 2008, Hohenhorst.

(Continued)

*Primary Examiner*—Michael Trettel
(74) *Attorney, Agent, or Firm*—Harter Secrest & Emery LLP; Stephen B. Salai, Esq.; Brian B. Shaw, Esq.

(57) ABSTRACT

A spring element unit for a padding element, especially a mattress, comprises a plurality of spring elements. The spring element consists of an open-cell polyurethane flexible foam material and comprises at least one recess. Such a spring element unit is used in a padding element, especially a mattress, which comprises a base body for receiving the spring element unit. Such a spring element unit prevents a build-up of heat and humidity between the body and the supporting padding element.

18 Claims, 4 Drawing Sheets

U.S. PATENT DOCUMENTS

| | | | |
|---|---|---|---|
| 3,047,282 A | 7/1962 | Hardy | |
| 3,633,228 A | 1/1972 | Zysman | |
| 3,720,966 A | 3/1973 | Zysman | |
| 3,885,257 A | 5/1975 | Rogers | |
| 4,042,987 A | 8/1977 | Rogers | |
| 4,194,255 A * | 3/1980 | Poppe | 267/153 |
| 5,107,558 A | 4/1992 | Luck | |
| 5,353,455 A * | 10/1994 | Loving et al. | 5/730 |
| 6,347,423 B1 * | 2/2002 | Stumpf | 5/720 |
| 6,704,962 B2 * | 3/2004 | Choi | 5/740 |
| 7,120,956 B1 * | 10/2006 | Liao | 5/719 |
| 7,496,981 B2 * | 3/2009 | Alonso Cucurull | 5/740 |
| 7,571,504 B2 * | 8/2009 | Kuo | 5/724 |
| 7,624,462 B2 * | 12/2009 | Cao et al. | 5/655.9 |
| 7,685,663 B2 * | 3/2010 | Rawls-Meehan | 5/719 |

FOREIGN PATENT DOCUMENTS

| | | |
|---|---|---|
| CA | 321473 | 12/1932 |
| DE | 3937214 A1 | 5/1991 |
| DE | 4029947 | 1/1992 |
| DE | 4300414 | 6/1994 |
| DE | 7829649 | 9/1996 |
| DE | 19521910 C1 | 9/1996 |
| DE | 29918893 U1 | 1/2000 |
| DE | 202005015047 U1 | 3/2006 |
| FR | 709641 A | 8/1931 |
| FR | 794573 | 2/1936 |
| GB | 376291 | 7/1932 |
| GB | 476659 A | 12/1937 |
| GB | 902272 A | 8/1962 |
| GB | 936540 | 9/1963 |
| JP | 08103581 A | 4/1996 |
| WO | 95/22922 | 8/1995 |
| WO | 20041102119 | 12/2004 |
| WO | 2007137993 | 12/2007 |

OTHER PUBLICATIONS

International Search Report and Written Opinion for related German Patent Application No. PCT/EP2007/055062.

* cited by examiner

SPRING ELEMENT UNIT FOR A PADDING ELEMENT, PARTICULARLY A MATTRESS

CROSS-REFERENCE TO RELATED APPLICATIONS

National stage application of PCT/EP2007/055062.

BACKGROUND OF THE INVENTION

1. Technical Field

The present invention relates to a spring element unit comprising a plurality of spring elements for a padding element, particularly a mattress. It furthermore relates to a padding element, particularly a mattress, comprising a base body and one such spring element unit.

In known inner spring mattresses fabric pocketed metal coils are provided as spring elements, such a metal spring core also being termed a Bonnel coil core or pocketed spring core. The metal spring core is topped by a foamed padding made as a rule from slabstock foam engineered to feature a specific elasticity. Known furthermore are foamed mattresses incorporating wire coils worked into the foamed core.

2. Description of Related Art

Known from German patent DE 299 18 893 U1 is a padding element for furniture and mattresses in which a plurality of spring elements are combined into a composite sheet. In this context the spring elements of made of sheep's wool and pocketed in cotton, the top ends of the pocketed coils forming the later surface to take the weight. To create an expansive padding element a plurality of spring elements is arranged juxtposed and each connected to the other, preferably by stitching, into rows.

Known furthermore from German patent DE 39 37 214 A1 is a padding element as a recliner, the mattress part of which is made of an elastic material, such as foamed plastics, featuring a plurality of juxtaposed channels into which fillings are inserted, resulting in the mattress part having zones differing in elasticity over its reclining portion. These fillings can be made of an elastic material corresponding to that of the mattress part.

SUMMARY OF THE INVENTION

With these known padding elements, particularly in application for mattresses, there is the drawback that heat and humidity build up between body and the supporting padding element. This is even more of a problem with mattresses since the heat and humidity collects more so by the sleeper being covered, especially where the body is in contact with the reclining zone of the mattress.

The invention is based on the object of proposing a spring element unit and a padding element which prevent heat and humidity building up between body and the supporting padding element.

To achieve this object it is provided for in a spring element unit of the aforementioned kind that the spring element is made of an open-cell flexible polyurethane foam and that at least one recess is provided in the spring element.

The spring element unit in accordance with the invention is based on having discovered the benefits of molding the spring element from an elastic flexible polyurethane foam and providing at least one recess. The recess serves to dissipate heat and humidity, respectively to enable air to flow in the direction of the supporting surface of the seating/recliner assembly. In other words the recess forms an air duct. It is basically possible to provide the spring element with a plurality of recesses. Since the spring element is made of a breathable flexible foam this additionally enhances dissipation of heat and humidity by an air flow to the supporting surface.

On top of this, it is easy to form the flexible polyurethane foam into any shape as required so that any shape of spring element can be produced to comply with the particularly application and the wanted material characteristics such as elasticity and permeability. In addition to this, flexible polyurethane foam advantageously features good long-term or fatigue strength performance.

Furthermore, the spring element is now void of any metal, i.e. there being no need for metallic inserts such as steel coils, for example, the spring element unit in accordance with the invention is accordingly particularly suitable for persons sensitive to magnetic radiation emanating from metallic objects.

Each spring element can be produced with differing material characteristics, but especially as regards its indentation hardness in thus being parcelled into a spring element unit wherein each spring element can be replaced where necessary.

The spring element unit in accordance with the invention is compatible with a wealth of applications, it being suitable, among other things, for a mattress, but just as well for a seat, particularly an automotive or aircraft seat. In this arrangement the spring element unit in accordance with the invention can be employed for padding both the seat and the back. In addition, the spring element unit in accordance with the invention finds application in upholstered furniture.

Advantageous aspects of the spring element unit in accordance with the invention form the subject matter of claims 2 to 9.

In one advantageous aspect the recess totally penetrates the spring element in the axial direction thereof. Thus, the spring element may feature, for example, a first face and a second face, the recess then extending from the first face through to the second face. To form a suitable air duct the recess is preferably oriented substantially vertical to the first face and second face.

In another advantageous aspect the spring element is made of molded foam. For this purpose in producing the spring element a reactant mixture is filled into the foaming mold and foamed into the final shape. To achieve this, the foaming mold is already engineered so that the spring element is provided with the recess during foaming. This eliminates the need for any subsequent machining of the spring element to produce the recess. It is in this way that simply by means of foaming a one-piece spring element is produced featuring a suitable punctiform elasticity and an enhanced breathing performance. In addition to this it is also possible to create a one-piece spring element unit incorporating several spring elements.

To advantage the recess is arranged roughly in the middle, resulting in the spring element complying practically symmetrically in taking the weight of the body so that the individual portions of the spring element are stressed practically uniformly. In addition, the recess can be positioned to achieve a predefined compliance in taking the weight of the body.

As regards shaping the recess it is of advantage that the recess has a straight or curved shape cross-sectionally and/or longitudinally. Such a shaping also involves a straight or curved shape portionally and combined. In this arrangement shaping the recess permits controlling or tweaking the compliance of the spring element in taking the weight of the body. Furthermore, the shape of the recess may vary along its extent within the spring element, by it being, for example, conical.

As regards shaping the spring element mainly with respect to its outer shell the choice is practically unlimited, but preferably a barrel or tubular shape, i.e. having a cornered or round basis involving, for example, an at least three, particularly eight-cornered, right circular or elliptical geometry is a choice. Also available to choice is to vary the cross-section shape over the height of the spring element unit by it being waisted, for instance. Shaping the outer shell of the spring element in this way likewise permits tweaking its compliance in taking the weight of the body.

In another advantageous aspect a plurality of spring elements is arranged juxtaposed, interconnected materially positively, preferably adhesively bonded, enabling a spring element unit to be composed of any number of spring elements. Such different packs of spring elements can be combined to form a supporting surface, each pack featuring, for example, a different elasticity to better satisfy the requirements in the various reclining or seating zones. It is furthermore of advantage that the material positive connection is at least in part elastic to prevent a rigid interconnection of the spring elements.

Expediently the spring elements are arranged juxtaposed such that a clearance exists in a portion between the shell surfaces of juxtaposed spring elements. This clearance is preferably achieved by suitably selecting the shape of the spring element in taking into account its composite compilation. For example, an octagonal basic shape is suitable for the spring element. The clearance formed between the spring elements can be likewise used to dissipate heat and humidity from the seating or reclining surface.

Furthermore in achieving the aforementioned object as it reads from claim 10 a padding element, particularly a mattress, comprising a base body and a spring element unit is proposed.

Such a padding element exploits the advantages afforded by the spring element unit in accordance with the invention, this in addition, doing away with the complications of interconnecting a plurality of spring elements by tapes or pocketings and incorporating them in the core of the mattress. Furthermore, the base body is preferably engineered in a foamed material, resulting in the padding element being totally free of metal. In addition to this the base body is easy to produce from a slabstock foam to any size. As regards the advantages of the spring element unit, preferably produced separately, reference is made to the above comments.

Advantageous aspects of the padding element in accordance with the invention are claimed in claims 6 to 16.

In one advantageous embodiment the base body comprises at least one cavity in which the spring element unit is accommodated. This permits locating on the base of the cavity a plurality of spring elements juxtaposed as a spring element unit and supported at the sides, for example, by a surrounding wall of the base body. Preferably the spring element unit has the same height as the cavity. Relative to the base of the base body the cavity may be provided in a portion designed to cushion the shoulders or buttocks. It may also be configured as just a sole cavity extending substantially full length. It is furthermore of advantage to provide a recliner with a cavity for the shoulders and another cavity for resting the buttocks.

In another preferred aspect a cover body is provided for placement on the spring element unit and/or on the base body, the cover body being materially positively connected, preferably adhesively bonded, to the base body and/or the spring element unit. It is particularly when a recess is provided in the base body that the cover body forms a kind of lid in thus functioning as a top closure of the padding element. Preferably the cover body is made of flexible polyurethane foam. As an alternative the cover body can be formed by a breathable layer, particularly breathable ticking.

To ensure the spring element unit is durably securely positioned relative to the base body the spring element unit has a material positive connection, it being preferably adhesively bonded to the base body. This connection is preferably made at the underside of the spring element unit, i.e. in the region of the surface which communicates the weight of the person resting on the padding element to the base body. In case the spring element unit is located in a cavity of the base body, the spring element unit can be connected by its side surfaces to the edge surface of the base body bordering the recess at least portionally as an alternative or additionally.

In yet another advantageous aspect the base body and/or the cover body are made of a flexible polyurethane foam. Preferably the base body is made from slabstock foam to permit fully automated, continuous production whilst eliminating the need for a multitude of feedstock materials to be stocked for production of spring element unit and base body.

To advantage the base body and/or the cover body are made of flexible polyurethane foam to thus enable the complete padding element to be made of one basic material.

It is furthermore an advantage when the indentation hardness of the spring element unit differs from the indentation hardness of the base body and/or of the cover body. Preferably the indentation hardness of the spring element unit is in a range of roughly 40 N to roughly 350 N, preferably in a range of roughly 60 N to roughly 260 N.

In still a further advantageous embodiment the base body and/or the cover body comprise nicks parallel to each other. Material from the nicks may be removed or not. In addition, the nicks can be provided both lengthwise and crosswise, by means of which the surface tension native to the material of the base body or cover body is reduced.

To achieve portions of differing hardness the nicks are differingly spaced from each other in certain zones, for example in the shoulder zone or buttocks zone. Thus, in the region of the shoulder zone added softness is achieved by the nicks being spaced closer together, allowing the shoulders to sink in softer and deeper, whereas zones featuring nicks spaced further away from each other add to the springiness in thus offering more support.

It is furthermore of advantage when the nicks comprise an inswept splayed cross-section, particularly a droplet-shaped cross-section, additionally enhancing the aeration.

To advantage the base body and/or the cover body are made of slabstock foam so that they can be continuously produced to any size as sold by the meter. Base body and cover body can be simply cut to size by their geometry being simple. Furthermore the at least one cavity can be simply machined automated.

To advantage the spring element unit is made of molded foam, this likewise simplifying production. In addition to this, the spring element produced by molded foaming is easy to locate, preferably likewise fully automated, on the base body or in a cavity of the base body after demolding, especially the recess in the spring element proving to be of assistance in this respect.

In conclusion it may be provided for that the cover body comprises breathable ticking. Such ticking may be provided as an alternative or in addition, to the aforementioned flexible polyurethane foam material.

BRIEF DESCRIPTION OF THE DRAWING FIGURES

The invention will now be explained with reference to the diagrammatic illustrations of the drawings in which:

FIG. 1 is a view in perspective of a first embodiment of the spring element unit in accordance with the invention;

FIG. 1b is a horizontal section through the spring element unit as shown in FIG. 1a;

FIG. 1c is a vertical section through the spring element unit as shown in FIG. 1a;

FIG. 4 is a horizontal section through a spring element unit comprising several spring elements in accordance with the invention as shown in FIG. 1a;

DETAILED DESCRIPTION OF THE INVENTION

Figure 1A:
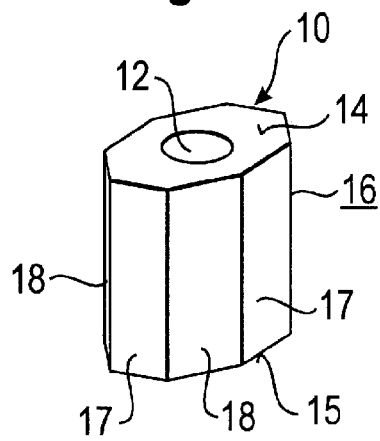
Figure 1B:
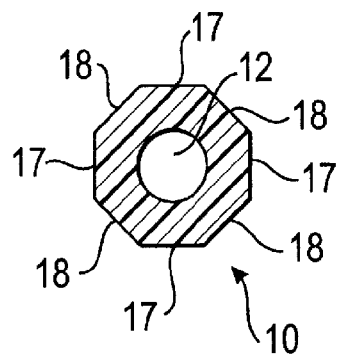
Figure 1C:
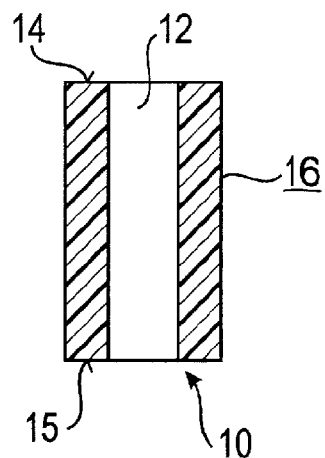
Figure 4:
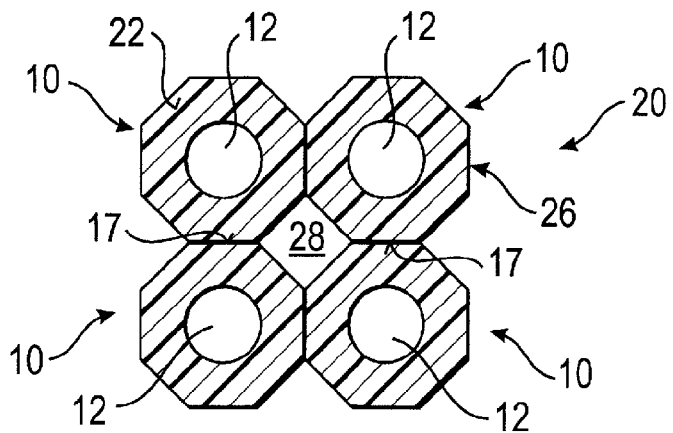

Referring now to FIGS. 1a to 1c there is illustrated a spring element 10, a plurality of which makes up the spring element unit 20 as shown in FIG. 4. The spring element unit 20 finds application in a padding element 30, for example in the form of a mattress, as shown in FIGS. 5a to 7b.

The spring element 10 consists exclusively of an elastic open-cell flexible polyurethane foam and is produced by molded foaming. The cylindrical spring element 10 comprises a side shell 16, a top end 14 and a bottom end 15. The top end 14 and the bottom end 15 are oriented substantially parallel to the resting surface. As particularly evident from FIG. 1b the spring element 10 comprises an octagonal base section constant over the full height of the spring element 10, so that the shell 16 is made up of vertical jointing face 17 and inclined side face 18.

Provided in the middle of the spring element 10 is a recess 12 extending axially, produced by a corresponding configuration of the foaming mold. The recess 12 has a circular cross-section (as sectioned horizontally) constant in shape over the height (as sectioned vertically) and serves as an air passage for heat and humidity dissipation.

Figure 2:
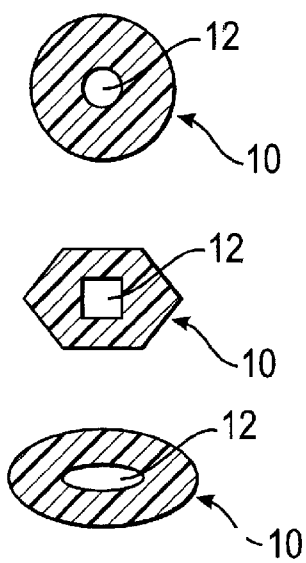
FIG. 2 is a horizontal section through further embodiments of the spring element unit in accordance with the invention as an alternative to that as shown in FIG. 1b.
Figure 3:
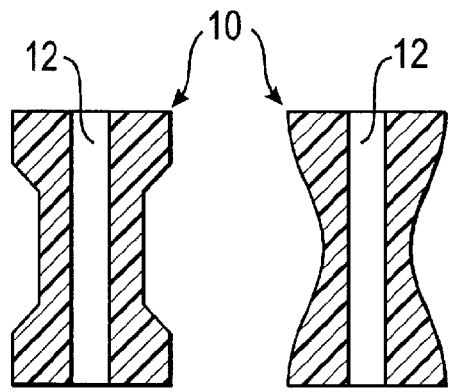
FIG. 3 is a vertical section through further embodiments of the spring element unit in accordance with the invention as an alternative to that as shown in FIG. 1c.

Referring now to FIGS. 2 and 3 there is illustrated as an alternative, how the spring element 10 and/or the recess 12 may be shaped, merely by way of example, in which also the side wall sections and recess shapes can be combined. As evident from FIG. 2 the spring element 10 as sectioned horizontally features a straight or curved shape, at least sectionwise, by being, for example circular elliptical or hexagonal in shape. Furthermore, as evident from FIG. 3, as viewed in a vertical section, the cross-section of the spring element 10 may vary in height by being, for example, curved in shape, especially waisted or sectionwise straight as, for example, a conical shape and also comprising shapes whose width and respectively the diameter of the top end 14, bottom end 15 are configured differingly large.

Referring now to FIG. 4 there is illustrated a preferred embodiment of a spring element unit 20 comprising a total of four spring elements 10 as shown in FIGS. 1a to 1c. The spring elements 10 arranged inline are materially positively connected in the region of their facing jointing face 17 by means of an adhesively bonded connection. In this arrangement the adhesive layer may be configured at least in part elastic to prevent a rigid configuration of the connection. Due to the octagonal basic shape of the spring element 10 and the connection via the jointing face 17, in addition to the individual recess 12 a clearance 28 is created in the portion between the inclined side face 18 which likewise permits dissipation of heat and humidity.

As an alternative to the spring element unit 20 as shown in FIG. 4 involving four spring elements 10 other combinations with any number of spring elements 10 are conceivable, it being in this way that prefabricated packs or lines of spring elements 10 can be made available.

On the basis of the spring element unit 20 as explained above and as shown in FIG. 4 several forms of configuring a padding element 30 comprising a plurality of spring element units 20 will now be explained which, as shown in FIGS. 5a to 7b substantially differ by the number of spring element units 20 provided and by the configuration or number of cavities 44 as a function thereof.

Referring now to FIGS. 5a to 7b there is illustrated in each case a padding element 30 in the form of a mattress with a base body 40 forming the core thereof, a cover body 50 and a plurality of spring element units 20 sandwiched between the cover body 50 and base body 40. All components of the padding element 30, i.e. the individual spring elements 10 forming the spring element unit 20, the base body 40 and the cover body 50 are each made totally of an open-cell flexible polyurethane foam. In this arrangement the indentation hardness of the spring elements 10 is in the range of roughly 40 N to roughly 350 N, preferably roughly 60 N to roughly 260 N. The base body 40 comprises a top end 41, a bottom end 42 and a circumferential side surface 43.

All cavities 44 as shown in FIGS. 5a to 7b are preferably produced by machining the corresponding volume of material from the foamed slabstock forming the base body 40. Each cavity 44 is defined by a substantially horizontal base surface 45 and an edge surface 46 oriented substantially vertical on all sides. In all embodiments as set forth in FIGS. 5a to 7b the spring element unit 20 is supported by the base body 40 such that the spring element unit 20 is nested in the cavity 44. In other words the underside 24 of the spring element unit 20 rests on the base surface 45. To ensure a stable and durable fixation of the spring element unit 20 in the cavity 44 the underside 24 has a material positive connection with the base surface 45 by means of an adhesively bonded layer. This adhesively bonded layer may be provided to cover the full surface, in strips or merely punctiform. Between the side surface 26 of the spring element unit 20 and the edge surface 46 of the base body 40 a gap may be provided at least sectionwise. The edging 47 remaining between the side surface 43 and the edge surface 46 is sufficiently thick to ensure side fixation of the spring element unit 20.

As an alternative to this adhesively bonded connection the side surface 26 of the spring element unit 20 is in contact with the edge surface 46 on all sides. This contact is preferably achieved by an oversize fit, i.e. the dimensions of the cavity 44 are at least slightly smaller than the outer dimensions of the spring element unit 20.

After nesting the spring element unit 20 in the cavity 44 and fixation preferably by means of an adhesively bonded layer the cover body 50 is placed on the top end 41 of the base body 40 flush and materially positively connected to the base body 40 by means of an adhesively bonded layer applied at least here and there. In addition, the underside of the cover body 50 is adhesively bonded to the upper side 22 of the spring element unit 20. The cover body 50 comprises a corresponding thickness and/or corresponding material properties so that it is adequately breathable to ensure heat and humidity dissipation in the direction of the spring element unit 20. In the example aspects as shown in FIGS. 5a to 7b the cover body 50 has a thickness of roughly 40 mm. As an alternative the cover body 50 can be formed by breathable ticking.

Figure 5A:
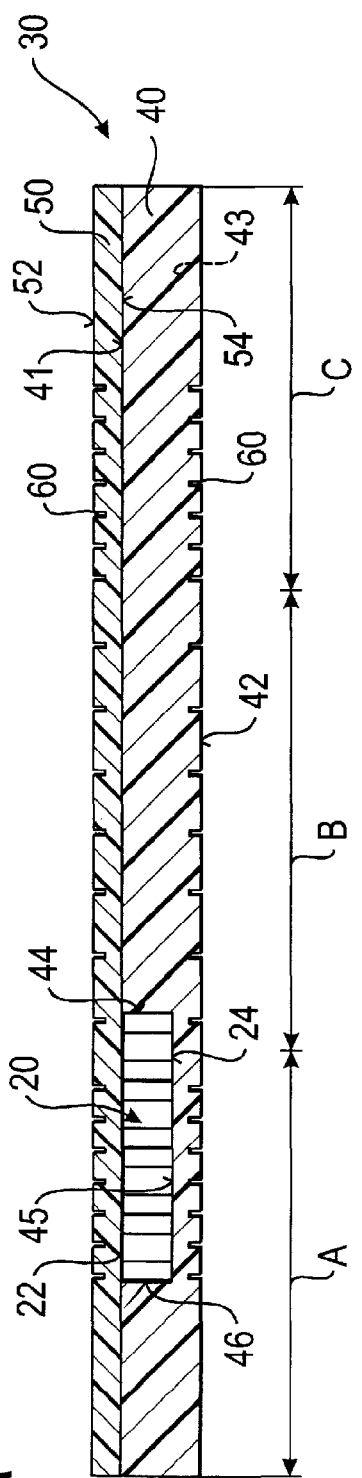
FIG. 5a is a vertical section through a first embodiment of the padding element in accordance with the invention comprising a plurality of spring element units as shown in FIG. 4.
Figure 5B:
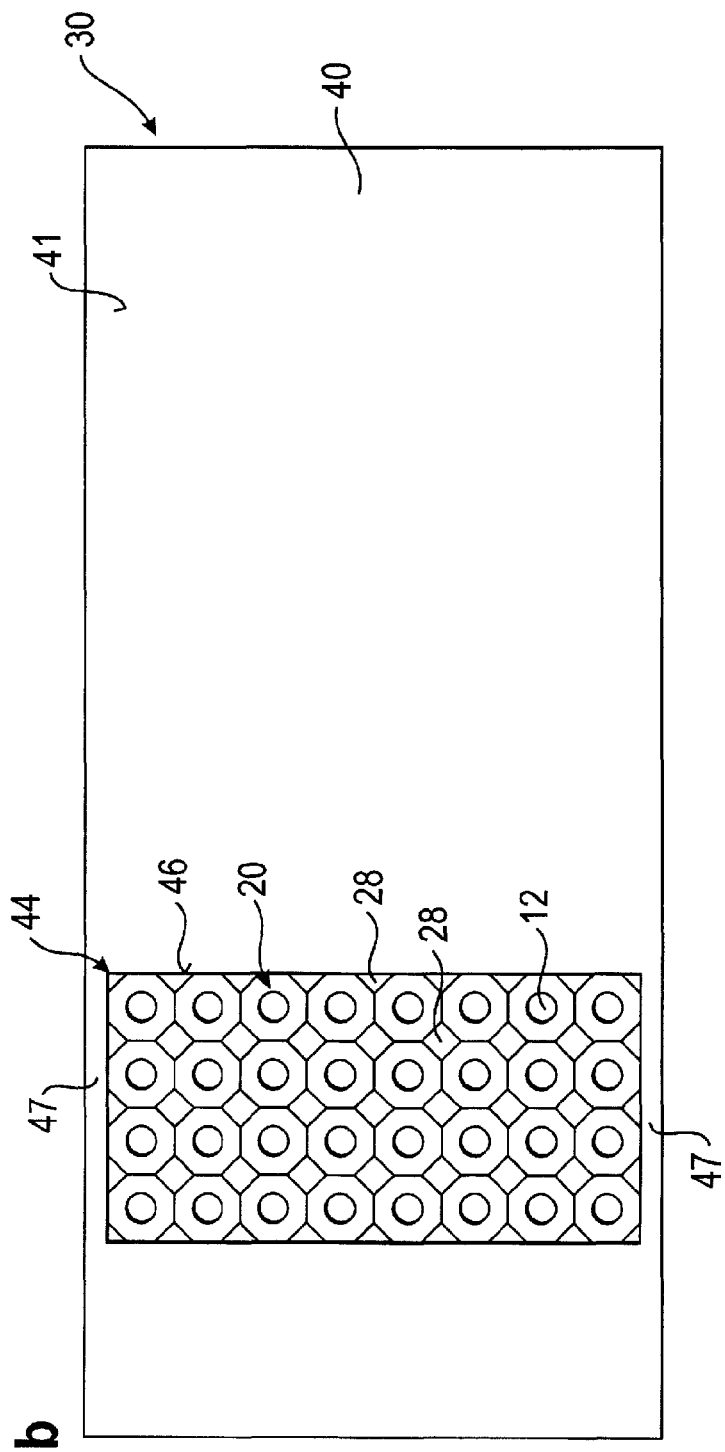
FIG. 5b is a top-down view of the base body of the padding element 30 as shown in FIG. 5a without cover body.
Figures 6A, 6B:
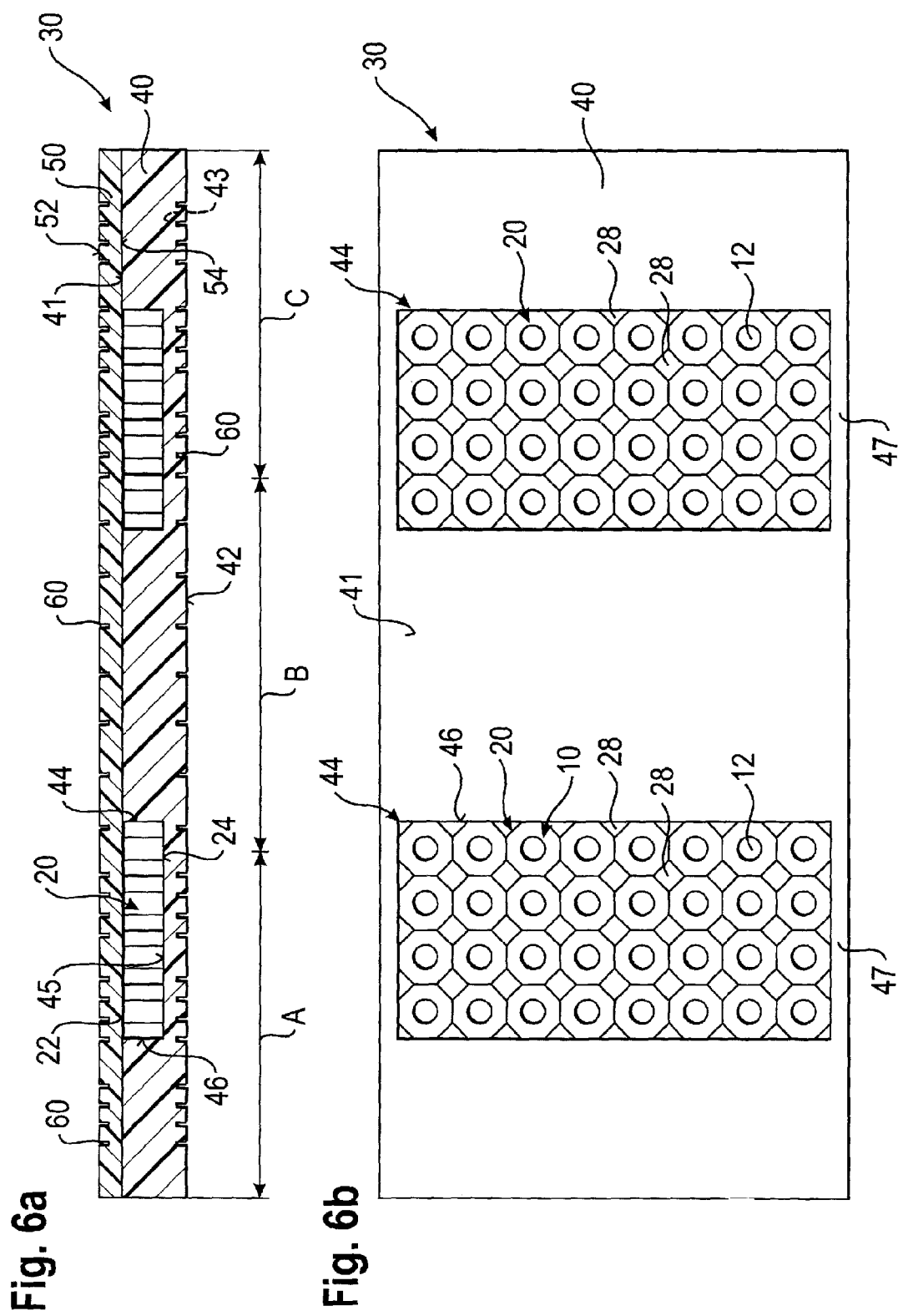
FIG. 6a is a vertical section through a second embodiment of the padding element in accordance with the invention comprising a plurality of spring element units as shown in FIG. 4.
FIG. 6b is a top-down view of the base body of the padding element as shown in FIG. 6a without cover body.
Figure 7A:
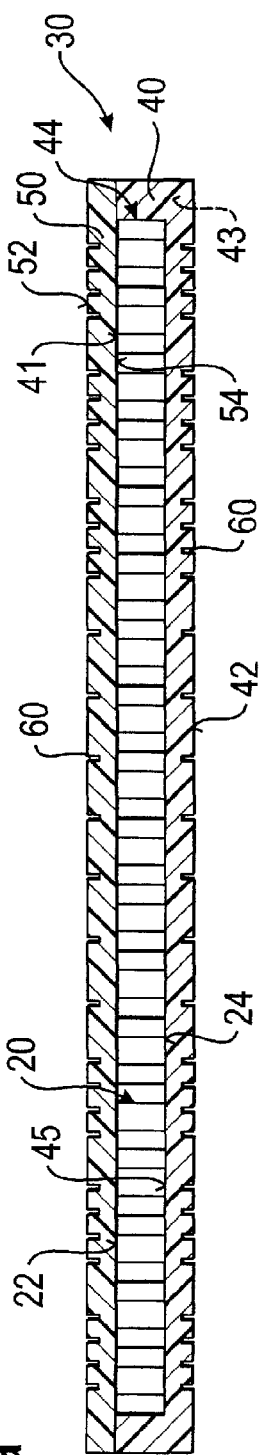
FIG. 7a is a longitudinal section through a third embodiment of the padding element in accordance with the invention comprising a plurality of spring element units as shown in FIG. 4.
Figure 7B:
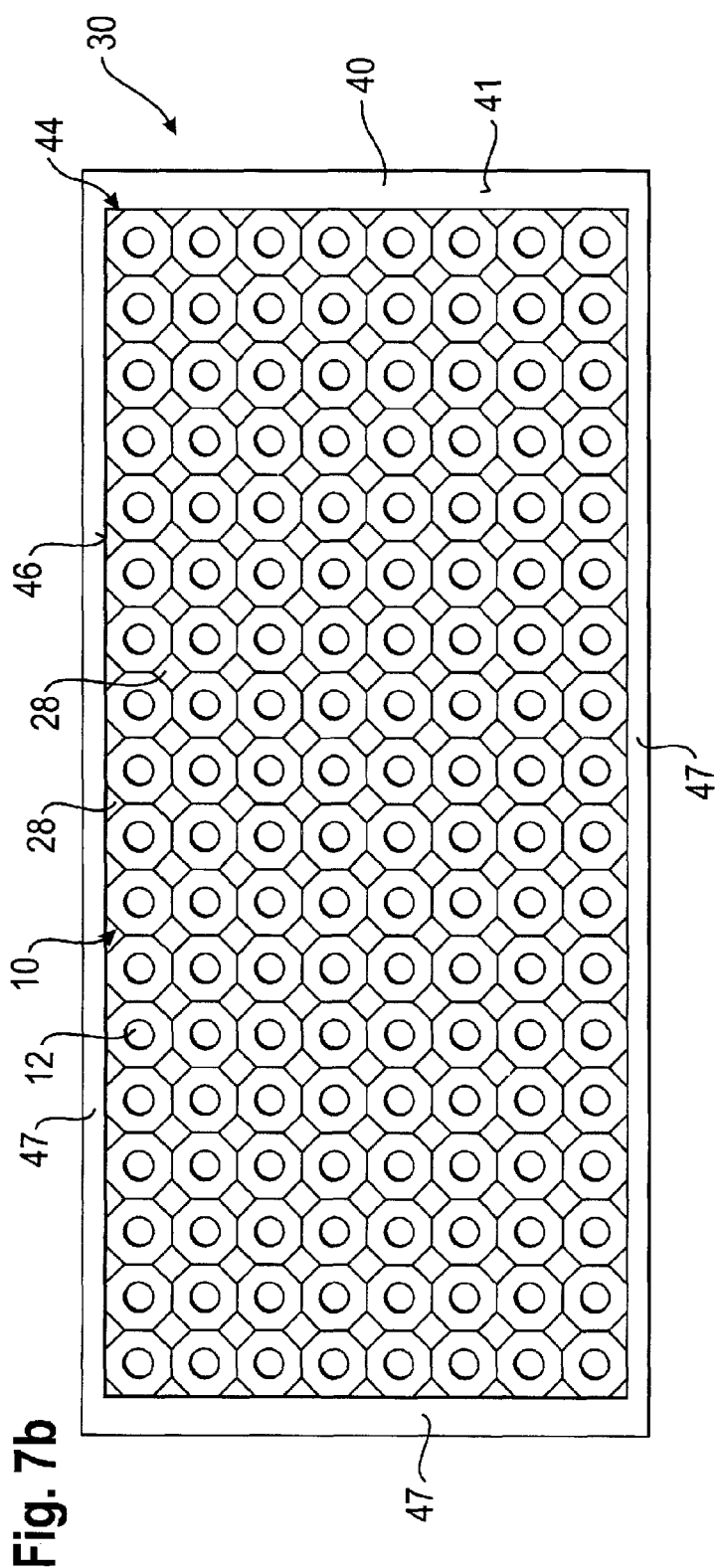
FIG. 7b is a top-down view of the base body of the padding element as shown in FIG. 7a without cover body.

The shapes as configured evident from FIGS. 5a to 7b mainly differ by the number of cavities 44 and their size. Thus, in the FIGS. 5b and 7b only one cavity 44 is evident, whilst in FIG. 6b two cavities 44 are configured. In FIG. 5b the cavity 44 is arranged in a first zone A of the base body 40, i.e. in the shoulder zone. In FIG. 6b a second cavity 44 is additionally provided in a second zone B roughly in the zone of the buttocks and thighs. Disposed between the first zone A and the third zone C is the second zone B. In FIG. 7b the cavity 44 extends practically over the full surface area of the base body 40, the wall 47 ensuring an adequate side fixation of the spring element unit 20.

In addition, the base body 40 and the cover body 50, as shown in FIGS. 5a to 7b, comprise nicks 60 oriented parallel to each other. In addition, the nicks 60 in the region of the top side 52 of the cover body 50 and in the region of the bottom end 42 of the base body 40 are incorporated in the form of a material recess. These nicks 60 reduce the surface tension in thus contributing towards enhancing the punctiform elasticity of the padding element 30.

Referring still to FIGS. 5a to 7b there is illustrated how the nicks 60 featured in the zones A, B, C are differingly spaced. Thus each spacing between the nicks 60 in both the base body 40 and cover body 50 in the region of the cavity 44, i.e. in FIG. 5b in the first zone A and in FIG. 6b in the third zone C is smaller than in the middle zone B as shown in FIGS. 5b and 6b. In other words the spacing of the nicks 60 in the region of the spring element unit 20 is selected smaller so that the elasticity in these zones can be additionally tweaked by means of the nicks 60. For example, the elasticity can be increased by arranging for the spacing of the nicks 60 to be smaller. In the variants as shown in FIG. 7b the nicks 60 are positioned in addition, in the region of the sole, expansive cavity 44 in several sub-portions differingly spaced. It is in this way that the punctiform elasticity provided by the large surface area spring element unit 20 can be tweaked in detail.

In conclusion the nicks 60 as shown in FIGS. 7b to 5b differ from the nicks 60 as shown in FIG. 6b by an inswept flared cross-section shape in the form of a droplet.

LIST OF REFERENCE NUMERALS 10 spring element
12 recess
14 top end
15 bottom end
16 shell
17 jointing face
18 side face
20 spring element unit
22 upper side
24 underside
26 side surface
28 clearance
30 padding element
40 base body
41 top end
42 bottom end
43 side surface
44 cavity
45 base surface
46 edge surface
47 wall
50 cover body
52 top side
54 bottom side
60 nicks
A first zone
B second zone
C third zone

The invention claimed is:

1. A mattress, comprising a base body and at least one spring element unit, wherein the base body comprises at least one cavity and an edging, wherein the spring element unit is accommodated in the cavity and the edging laterally supports the spring element unit, wherein the spring element unit comprises a plurality of spring elements, wherein the spring elements and the base body each are made of an flexible polyurethane foam and wherein the indentation hardness of the spring element unit differs from the indentation hardness of the base body, wherein the spring elements in cross-section comprise a side shell comprising jointing faces and side faces, wherein the spring elements are placed side-by-side such that the jointing faces of neighboring spring elements abut each other and a clearance is formed between the side faces of neighboring spring elements, and wherein the spring element comprises at least one recess as an air channel for dissipating moisture and a top end and a bottom end, wherein the recess extends end-to-end from the top end to the bottom end.

2. The mattress as set forth in claim 1, in which the spring elements have an octagonal cross-section.

3. The mattress as set forth in claim 1, in which the recess is arranged roughly in the middle.

4. The mattress as set forth in claim 1, in which the recess has a straight or curved, preferably a round, shape cross-sectionally.

5. The mattress as set forth in claim 1, in which the recess has a straight or curved shape longitudinally.

6. The mattress as set forth in claim 1, in which a cover body is provided for placement on the spring element unit and/or on the base body, the cover body being materially positively connected, preferably adhesively bonded, to the base body and/or the spring element unit.

7. The mattress as set forth in claim 1, in which the spring element unit is materially positively connected, preferably adhesively bonded to the base body.

8. The mattress as set forth in claim 6, in which the cover body is made of a flexible polyurethane foam.

9. The mattress as set forth in claim 6, in which the indentation hardness of the spring element unit differs from the indentation hardness of the cover body.

10. The mattress as set forth in claim 1, in which the indentation hardness of the spring element unit is in a range of roughly 40 to 350 N.

11. The mattress as set forth in claim 1, in which the base body and/or the cover body comprise nicks parallel to each other.

12. The mattress as set forth in claim 11, in which the nicks are differingly spaced from each other.

13. The mattress as set forth in claim 11, in which the nicks comprise an inswept splayed cross-section, particularly a droplet-shaped cross-section.

14. The mattress as set forth in claim 1, in which the base body and/or the cover body are made of slabstock foam.

15. The mattress as set forth in claim 1, in which the spring element unit is made of molded foam.

16. The mattress as set forth in claim 6, in which the cover body comprises a breathable ticking.

17. The mattress as set forth in claim 10, in which the indentation hardness of the spring element unit is in a range of approximately 60 N to approximately 260 N.

18. The mattress as set forth in claim 11, in which the nicks comprise a droplet-shaped cross-section.

* * * * *